US012782928B2

(12) United States Patent
Horry et al.

(10) Patent No.: US 12,782,928 B2
(45) Date of Patent: Nov. 3, 2026

(54) SYSTEM AND METHOD FOR DETECTING ANOMALOUS SYSTEM BEHAVIOUR

(71) Applicant: BAE SYSTEMS plc, London (GB)

(72) Inventors: Samuel Horry, Portsmouth (GB); Hans-Heinrich Mai, Portsmouth (GB); Richard Edward John Nicklin, Portsmouth (GB)

(73) Assignee: BAE SYSTEMS PLC, London (GB)

( * ) Notice: Subject to any disclaimer, the term of this patent is extended or adjusted under 35 U.S.C. 154(b) by 342 days.

(21) Appl. No.: 18/705,118

(22) PCT Filed: Oct. 27, 2022

(86) PCT No.: PCT/GB2022/052736
§ 371 (c)(1),
(2) Date: Apr. 26, 2024

(87) PCT Pub. No.: WO2023/073373
PCT Pub. Date: May 4, 2023

(65) Prior Publication Data

US 2024/0427320 A1 Dec. 26, 2024

(30) Foreign Application Priority Data

Oct. 27, 2021 (EP) .................................... 21275151
Oct. 27, 2021 (GB) .................................... 2115423

(51) Int. Cl.
*G05B 23/02* (2006.01)
*G06N 7/01* (2023.01)

(52) U.S. Cl.
CPC ....... *G05B 23/024* (2013.01); *G05B 23/0283* (2013.01); *G06N 7/01* (2023.01); *G05B 2223/02* (2018.08)

(58) Field of Classification Search
CPC .............. G05B 23/024; G05B 23/0283; G05B 2223/02; G06N 7/01
See application file for complete search history.

(56) References Cited

U.S. PATENT DOCUMENTS

2016/0097698 A1 4/2016 Leao
2020/0265331 A1* 8/2020 Tashman ................ G06N 20/20
(Continued)

FOREIGN PATENT DOCUMENTS

EP 3255588 A1 12/2017
WO 2023073373 A1 5/2023

OTHER PUBLICATIONS

International Search Report and Written Opinion received for PCT/GB2022/052736. Mailed: Feb. 3, 2023. 15 pages.
Extended European Search Report received for EP Application No. 21275151.5, dated Apr. 19, 2022. 8 pages.
Combined Search and Examination Report under Sections 17 and 18(3) received for GB Application No. 2115423.2, dated May 6, 2022. 12 pages.
Kordestani, et al., "A New Hybrid Fault Prognosis Method for MFS Systems Based on Distributed Neural Networks and Recursive Bayesian Algorithm", IEEE Systems Journal, vol. 14, No. 4, (May 12, 2020), pp. 5407-5416.
(Continued)

*Primary Examiner* — Michael W Choi
(74) *Attorney, Agent, or Firm* — Arcane Law PLLC

(57) ABSTRACT

A method and apparatus for predicting failure of an engineering asset based on real-time data. The system comprises a plurality of sensors for measuring data on the engineering asset. The method of predicting failure comprises receiving a data record comprising data on the engineering asset collected from the plurality of sensors at time t, generating, using a trained machine learning algorithm, a probability $P_F$ that the received data record indicates that the engineering asset is in a faulty state; determining what number of data records received in a look-back time $L_t$ are indicative of the engineering asset being in a faulty state, wherein the look-back time $L_t$ is a time period occurring before the time t at which the data record was collected; and predicting a probability of the engineering asset failing during a horizon time $H_t$, wherein the horizon time $H_t$ is a time period after time t at which the data record was collected. The predicting step implements a Bayes forecasting model to predict the
(Continued)

probability of failure based on the generated probability $P_F$ and the number of data records which were determined to be faulty within the look-back time $L_t$.

20 Claims, 5 Drawing Sheets

(56) References Cited

U.S. PATENT DOCUMENTS

| | | | | |
|---|---|---|---|---|
| 2021/0232731 | A1* | 7/2021 | Wang | G06F 30/20 |
| 2023/0334363 | A1* | 10/2023 | Bouaziz | G05B 23/024 |

OTHER PUBLICATIONS

Tahan, et al., "Performance-based health monitoring, diagnostics and prognostics for condition-based maintenance of gas turbines: A review", Applied Energy, Elsevier Science Publishers, vol. 198, (Apr. 28, 2017), pp. 122-144.

Atamuradov, et al., "Prognostics and Health Management for Maintenance Practitioners-Review, Implementation and Tools Evaluation", International Journal of Prognostics and Health Management, (2017), 31 pages.

* cited by examiner

SYSTEM AND METHOD FOR DETECTING ANOMALOUS SYSTEM BEHAVIOUR

TECHNICAL FIELD

The present invention relates generally to a system and method for detecting anomalous system behavior, for example in complex engineering assets including those found in maritime vessels.

BACKGROUND

Prognostics and Health Management (PHM) is an active and well subscribed to field of study. Companies managing complex distributed or safety-critical engineering assets want to understand the status of their portfolio in order to maximize efficiency and minimize downtime. Approaches such as health scores, anomaly detection, failure prediction and remaining useful life (RUL) calculation are applied across various domains in order to advise maintenance and repair schedules.

The published literature in this field will typically use synthetic data or carefully collected lab-based data to demonstrate the proficiency of a technique, however the use of "real-world" applications is less common. The challenges of developing PHM algorithms to run in a real-world environment are discussed and postulated, but tangible examples are not widespread. For example, see as a reference "Prognostics and Health Management for Maintenance Practitioners-Review, Implementation and Tools Evaluation" by Atamuradov et al. published in International Journal of Prognostics and Health Management in 2017.

Most known PHM applications apply to engineered systems operating in and on a well-defined single-state and without consideration of prior usage and age. Especially, but not exclusively, in the maritime domain, engineering systems' operating envelopes are manifold by design and operating environment, and can include rapid, anomalous transient events (the term may be used interchangeably with "transients"). These transients can pose problems for classic machine learning (ML) algorithms, in that during these events a system may exhibit behavior consistent with impending failure before recovering to "healthy" behavior, leading to a false-positive which results in wasted repair efforts and a loss of operator confidence in the prognostic algorithm. This problem is further compounded by the fact that such transient events can cause low-level damage to a device, resulting in an increased risk of failure at a later date.

ML algorithms performing anomaly-based fault detection are rarely capable of estimating the remaining useful life (RUL) of a system. However, it is of enormous benefit to a maintainer to have such an estimate and a probability value attached to the estimate in order to permit maximum efficiency in task planning and supply chain optimization. Furthermore, existing non-deep learning ML anomaly-based detectors, especially in the maritime domain, tend to trigger far in advance of system failure, provoking excessively early intervention by a maintainer, denying the operator the economic benefits of extracting maximum use from an asset.

It is an example aim of the present invention to at least partially overcome or avoid one or more problems of the prior art, whether identified herein or elsewhere, or to at least provide an alternative to existing systems and related methodologies.

SUMMARY

According to first and second aspect of the present inventions, there is provided a method and a system for training an autoencoder as set out in in the independent claims. Further and optional features are described in the dependent claims.

We describe a method for a computer-implemented method for predicting failure of an engineering asset based on real-time data, the method comprising: receiving a data record comprising data on the engineering asset collected from a plurality of sensors at time t, generating, using a trained machine learning algorithm, a probability $P_F$ that the received data record indicates that the engineering asset is in a faulty state; determining what number of data records received in a look-back time $L_t$ are indicative of the engineering asset being in a faulty state, wherein the look-back time $L_t$ is a time period occurring before the time t at which the data record was collected; and predicting a probability of the engineering asset failing during a horizon time $H_t$, wherein the horizon time $H_t$ is a time period after time t at which the data record was collected; wherein the predicting step comprises implementing a Bayesian model to predict the probability of failure within the horizon time $H_t$ based on the generated probability $P_F$ and the number of data records which were determined to be faulty within the look-back time Lt.

We also describe a system for predicting failure of an engineering asset based on real-time data, the system comprising: a plurality of sensors for measuring data on the engineering asset and a processor which is configured to receive a data record comprising data on the engineering asset collected from the plurality of sensors at time t, generate, using a trained machine learning algorithm, a probability $P_F$ that the received data record indicates that the engineering asset is in a faulty state; determine what number of data records received in a look-back time $L_t$ are indicative of the engineering asset being in a faulty state, wherein the look-back time $L_t$ is a time period occurring before the time t at which the data record was collected; and predict a probability of the engineering asset failing during a horizon time $H_t$, wherein the horizon time $H_t$ is a time period after time t at which the data record was collected; wherein predicting comprises implementing a Bayesian model to predict the probability of failure with the horizon time $H_t$ based on the generated probability $P_F$ and the number of data records which were determined to be faulty within the look-back time $L_t$.

The predicted probability of failure may be compared to a failure threshold. When the predicted probability exceeds the failure threshold, there is a high risk that the engineering asset will fail within the horizon time. In this instance, an alert may be output, for example to act as a decision aid to a user. Alternatively, an automated self-protection protocol within the asset may be triggered. The self-protection protocol may control one or more components within the asset to return the asset to normal behavior or may shut down the engineering asset. For example where the engineering asset comprises a diesel engine, shaft-speed limitations may be introduced or where the engineering asset comprises a pump, suction pressure, motor speed or discharge pressure within the pump may be adjusted or controlled. Merely as another example, where the engineering asset is a refrigeration plant, the asset may be shutdown. When the predicted probability is below the failure threshold, a new data record may be received for evaluation.

The invention may be considered to be a prognostics and health management (PHM) application which provides a probability of failure forecast for users including operators and maintenance staff. The invention may be used for monitoring any complex engineering asset whose operation may be described by a data set including a plurality of physical parameters which are measured by the plurality of sensors. Merely as examples, such engineering assets may be within a marine vessel, for example a diesel engine, an electrical pump, a refrigeration plant, or a high voltage switchboard. Such engineering assets may be in other systems, e.g. railway rolling stock bogies, nuclear reactor coolant pumps, gas turbine engines for passenger aircraft or oil rig drill bearings.

As set out above, an output of the trained machine learning algorithm is the probability of the received data record being faulty ($P_F$). The trained machine learning algorithm may also be used to generate the probability of each of the data records received within the look-back time being faulty. From these generated probabilities a binary fault value for each of the multiple data records (i.e. the received data record and the data records within the look-back time) may be determined. For example, the fault value for each of the multiple data records may be equal to 1 when a probability that the data record is faulty exceeds a probability threshold and 0 otherwise. The fault value $F_{i,t}$ for each record i at time t may be defined as $$F_{i,t} = \begin{cases} 0, & P_F < P_{th} \\ 1, & P_F \geq P_{th} \end{cases} \quad \text{(equation 1)}$$

where $P_F$ is the probability of the data record being faulty and $P_{th}$ is the probability threshold.

The present invention uses real-time data from multiple sensors. Owing to the potential for transients (as defined in the background section above) leading to an erroneous classification of the status of a data record, a Bayesian model to predict the probability of failure with the horizon time $H_t$ based on the generated probability $P_F$ and the number of data records which were determined to be faulty within the look-back time $L_t$ is used. By considering individual received data records together with previous faulty records, the likelihood of one anomalous data record erroneously triggering a failure prediction may be reduced. Thus, the method mitigates against the risk of an incorrect diagnosis of failure of the engineering asset based on one real-time record.

This mitigation or smoothing of the effect of one data record may be expanded further by considering a rolling average of the faulty state value $F_{i,t}$ over a period (or "envelope") of time (duration $e_L$). The method may thus comprise grouping the received data record with multiple previously received data records to form an envelope of data records. Determining what number of data records received in the look-back time are indicative of the engineering asset being in a faulty state may comprise determining what number of envelopes received in the look-back time are indicative of the engineering asset being in a faulty state.

Each envelope may have an envelope length ($e_L$) and may contain a sequence of all data records recorded during a time interval which is equal in length to the envelope length $e_L$. The time interval may be measured back in time from the recordal time t of the final (or most recent) data record of the sequence of data records. There may be the same or a different number of data records in each data envelope. When each of the data records is captured at a set, uniform frequency, there will be the same number of data records within each envelope. However, the data records may be recorded at irregular time intervals and in such an instance, the envelopes may contain different numbers of data records.

The use of a rolling average (i.e. envelopes) has the effect of "smoothing" out the impact that a rapid transient/anomalous record may have on the determination of whether the underlying monitored engineering asset truly is in a faulty or "non-faulty" state. This rolling average is hereafter referred to as the sick rate. The sick rate of each data envelope may be equal to the sum of each fault value for the multiple data records within the data envelope, divided by the number of data records within the data envelope. In other words, the sick rate may be a normalized sum of the fault values. The sick rate $S_R$ may be calculated as defined below:

$$S_R = \frac{\sum_{t-e_L}^{t} F_{i,t}}{N} \quad \text{(equation 2)}$$

where $F_{i,t}$ is the binary fault value for each record i within the envelope and N is the number of records within the envelope.

From these generated sick rates, a binary sick value for each of the multiple data envelopes may be determined. A data envelope (recorded in the j-th position of a sequence of envelopes and terminating at a time t) may be determined to be indicative of running in a faulty state when a sick rate of the data envelope equals or exceeds a sick rate threshold and a data envelope may be indicative of running in a non-faulty state when a sick rate of the data envelope is lower than the sick rate threshold. An envelope which is determined to be faulty state may be given a sick value of 1 and an envelope which is determined to be non-faulty state may be given a sick value of 0. The sick value $S_{j,t}$ may be defined as:

$$S_{j,t} = \begin{cases} 0, & S_R < S_{crit} \\ 1, & S_R \geq S_{crit} \end{cases} \quad \text{(equation 3)}$$

where $S_R$ is the sick rate and $S_{crit}$ is the sick rate threshold.

As set out above, the Bayesian model may be implemented to predict the probability of failure within the horizon time $H_t$ based on the generated probability $P_F$ and the number of data records which were determined to be faulty or "non-faulty" within the look-back time $L_t$. For example, the Bayesian model may be defined as:

$$P(F_{H_t} | n_{Lt}) = \frac{P(n_{Lt} | F_{H_t}) \times P(F_{H_t})}{P(n_{Lt})} \quad \text{(equation 4)}$$

where $F_{Ht}$ is the failure of the engineering asset within the time period which follows the moment of evaluation t and which is equal in length to the horizon time $H_t$, $n_{Lt}$ is the number of faulty records or envelopes within the look-back time $L_t$ prior to the moment of evaluation t, $P(F_{Ht}|n_{Lt})$ is the probability of failure of the engineering asset within the horizon time $H_t$ given n records or envelopes classed as faulty in time $L_t$, $P(n_{L,t}|F_{Ht})$ is the probability of n records or envelopes being classed as faulty in look back time $L_t$ given that a failure is known to have occurred within the horizon time $H_t$, $P(F_{Ht})$ is the probability of failure of the engineering asset in any time period equivalent in length to the horizon time $H_t$ and $P(n_{Lt})$ is the probability of n records or envelopes being classed as faulty in any time equivalent in length to the look-back time $L_t$. In other words, for any given record, a probability function which predicts the probability of the engineering asset failing completely in the horizon time from that record may be determined as a product of the probability of n records/envelopes being classed as faulty in the look-back time and the probability of the engineering asset failing in any time of length equivalent to the horizon time divided by the probability of n records being classed as faulty in any time of length equivalent to the look-back time.

As set out above, the output of the trained machine learning algorithm is the probability ($P_F$) of the received data record indicating that the engineering asset is in a faulty state. The number of data records/envelopes ($n_{Lt}$) in the look-back time $L_t$ which are indicative of the engineering asset being in a faulty state is also determined. In addition to the probability ($P_F$) and the determined number of data records/envelopes, the Bayesian model may also be built based on knowledge of how many faults the engineering asset may manifest per unit time and/or how many records (or envelopes) may be classified as pertaining to a faulty state per unit time. This information may be obtained from a look-up table or other database which stores this information. The various probabilities which are input into the Bayesian model, e.g. $P(n_{Lt}|F_{Ht})$, $P(F_{Ht})$ and $P(n_{Lt})$ may be calculated using known techniques from the probability ($P_F$), the number of faulty data records/envelopes $n_{Lt}$. the faults per unit time and the number of faulty records per unit time. This may be done using any suitable technique, for example a frequentist approach (i.e. consulting a stored historical database and determining the frequency of events) may be suitable. As an example, $P(F_{Ht})$ may be determined by calculating the total number of records for which there is a failure within the following horizon time, and dividing by the total number of records available.

The predicted probability may be compared to a failure threshold and when the predicted probability is equal to or exceeds the failure threshold, an alert may be output to a user. The alert may be an audio or visual cue, or a combination of both.

The Bayes forecasting model may comprise a plurality of sub-models, one for each of a plurality of different look-back times ($L_0, L_1, L_2, \ldots, L_j$). The method may comprises, for each sub-model: determining what number of data records ($n_{L0}, n_{L1}, n_{L2}, \ldots n_{t,j}$) received in the corresponding look-back time ($L_0, L_1, L_2, \ldots L_j$) are indicative of the engineering asset being in a faulty state.

Before the implementation of the method and system described above, an arbitrary machine learning algorithm needs to be trained before use. The data records within the training data correspond to the data records which are received for prediction purposes. In other words, the training data comprises data records having data collected from at least the same set of sensors. The training data may be stored on a database which may be separate to the system which implements the prediction. Indeed, the training may be carried out on a separate system and the trained algorithm transferred to the prediction system when required.

The method may comprise training the machine learning algorithm by receiving multiple data records for at least one engineering asset which corresponds to the engineering asset for which failure is to be predicted classifying each of the multiple data records as either indicative of at least one engineering asset running in an acceptable state or running in a faulty state. Classifying an engineering asset as running in an "acceptable" running state may be considered as a "non-faulty" running state and may also be considered as an alternative to the known method of classification as a "healthy" state. The multiple data records may comprise data previously collected from the plurality of sensors at a sequence of times prior to failure of at least one engineering asset which may be identical to the engineering asset being monitored.

The training may be implemented separately to the prediction and thus according to another aspect of the invention, there is provided a computer-implemented method for training a machine learning algorithm to predict failure of an engineering asset based on real-time data, the method of training comprising: receiving multiple data records for at least one engineering asset which corresponds to the engineering asset for which failure is to be predicted, wherein the multiple data records comprise data previously collected from the plurality of sensors at a sequence of times prior to failure of the least one engineering asset; and classifying each of the multiple data records as either indicative of the at least one engineering asset running in an acceptable state or running in a faulty state.

Classifying each of the multiple data records as indicative of running in a faulty state may comprise obtaining a minimum remaining running time, MRRT, which is a time period before failure of the at least one engineering asset; and classifying each of the multiple data records which is within the minimum remaining running time as indicative of running in a faulty state. The MRRT may be obtained by an input from an operator who has knowledge of the engineering asset or may be input automatically by the management system. The MRRT may be determined based on cost/benefit calculations. Such a determination, in the context of a maritime vessel, might be performed by an insurer or maritime engineer. The MRRT may be any appropriate time period, e.g. measured in seconds, hours or even days, depending on the system.

Classifying each of the multiple data records as indicative of running in an acceptable state may comprise obtaining a minimum running time, MRT, which is a time period after the at least one similar engineering asset has been started; and classifying each of the multiple data records which is after the minimum running time and before the minimum remaining running time as indicative of running in an acceptable state. In other words, the "acceptable" running data is sampled from the data records between the MRT and the MRRT and thus this training uses acceptable running sampling (ARS). The MRT may be obtained by an input from an operator who has knowledge of the engineering asset or may be input automatically by the management system. The MRT may be any appropriate time period, e.g. measured in seconds, hours or even days, depending on the system. Although data received in the MRT may not be included in the training data, data received in the MRT for an engineering asset for which failure is being monitored is likely to be included when making the predictions.

As an alternative, or in addition to training using the acceptable running sampling (ARS) described above, time envelopes (as described above) may also be used. The method may comprise training the machine learning algorithm by receiving multiple data records for at least one engineering asset which corresponds to the engineering asset for which failure is to be predicted, wherein the multiple data records comprise data previously collected from the plurality of sensors at a sequence of times prior to failure of the least one engineering asset; grouping the multiple data records into a plurality of data envelopes, wherein each envelope has an envelope length ($e_L$) and contains a sequence of all data records recorded during a time interval of length $e_L$; and targeting correct classification of each data record within each data envelope as indicative of running in a faulty state or running in a not-faulty state.

This training may also be implemented separately to the prediction and thus according to another aspect of the invention, there is provided a computer-implemented method for training a machine learning algorithm to predict failure of an engineering asset based on real-time data, the method of training comprising: receiving multiple data records for at least one engineering asset which corresponds to the engineering asset for which failure is to be predicted, wherein the multiple data records comprise data previously collected from the plurality of sensors at a sequence of times prior to failure of the least one engineering asset; grouping the multiple data records into a plurality of data envelopes, wherein each envelope have an envelope length ($e_L$) and contains a sequence of all data records recorded during a time interval of length $e_L$; and targeting correct classification of each data record within each data envelope as indicative of running in a faulty state or running in a not-faulty state.

As set out above, there may be the same or a different number of data records in each data envelope. Targeting correct classification may comprise calculating a sick rate for each envelope, for example using equation 2 above. Targeting correct classification may comprise calculating a sick value for each envelope, for example using equation 3 above.

Thus, according to another aspect of the invention, there is provided a method for a computer-implemented method for detecting anomalous behavior of an engineering asset based on real-time data, the method comprising: receiving a data record comprising data on the engineering asset collected from a plurality of sensors at time t; and classifying, using a trained machine learning algorithm, the data record as faulty or not-faulty, wherein the machine learning algorithm has been trained as described above using one or both of acceptable running sampling and time envelopes. Classifying may further comprise grouping the received data record with a set of previously received data records to form a data envelope, classifying the data envelope as faulty or not-faulty and applying the classification of the data envelope to the data record.

According to another aspect of the invention, there is a non-transitory computer-readable medium comprising processor control code which when running on a system causes the system to carry out the method described above.

The various aspects described above may be considered to include a novel three-fold approach using one or more of acceptable running sampling, time envelopes and a Bayesian forecasting approach. The outputs may be presented as a decision aid in a graphical user interface (GUI) that allows the user to identify suitable maintenance actions. The application is designed such that the maximum acceptable use can be extracted from an engineering asset without excessively early intervention.

It will be appreciated that any one or more features described in relation to an aspect of the invention may replace, or be used in combination with, any one or more features described in relation to another aspect of the invention, unless such replacement or combination would be understood by the skilled person as mutually exclusive, after a reading of this disclosure. In particular, any features described in relation to apparatus-like aspects may be used in combination with, or in place of, any features described in relation to method-like aspects. They may also be carried out in any appropriate order.

BRIEF DESCRIPTION OF THE DRAWINGS

For a better understanding of the invention, and to show how embodiments of the same may be carried into effect, reference will now be made, by way of example, to the accompanying diagrammatic figures in which.

DETAILED DESCRIPTION

Figure 1:
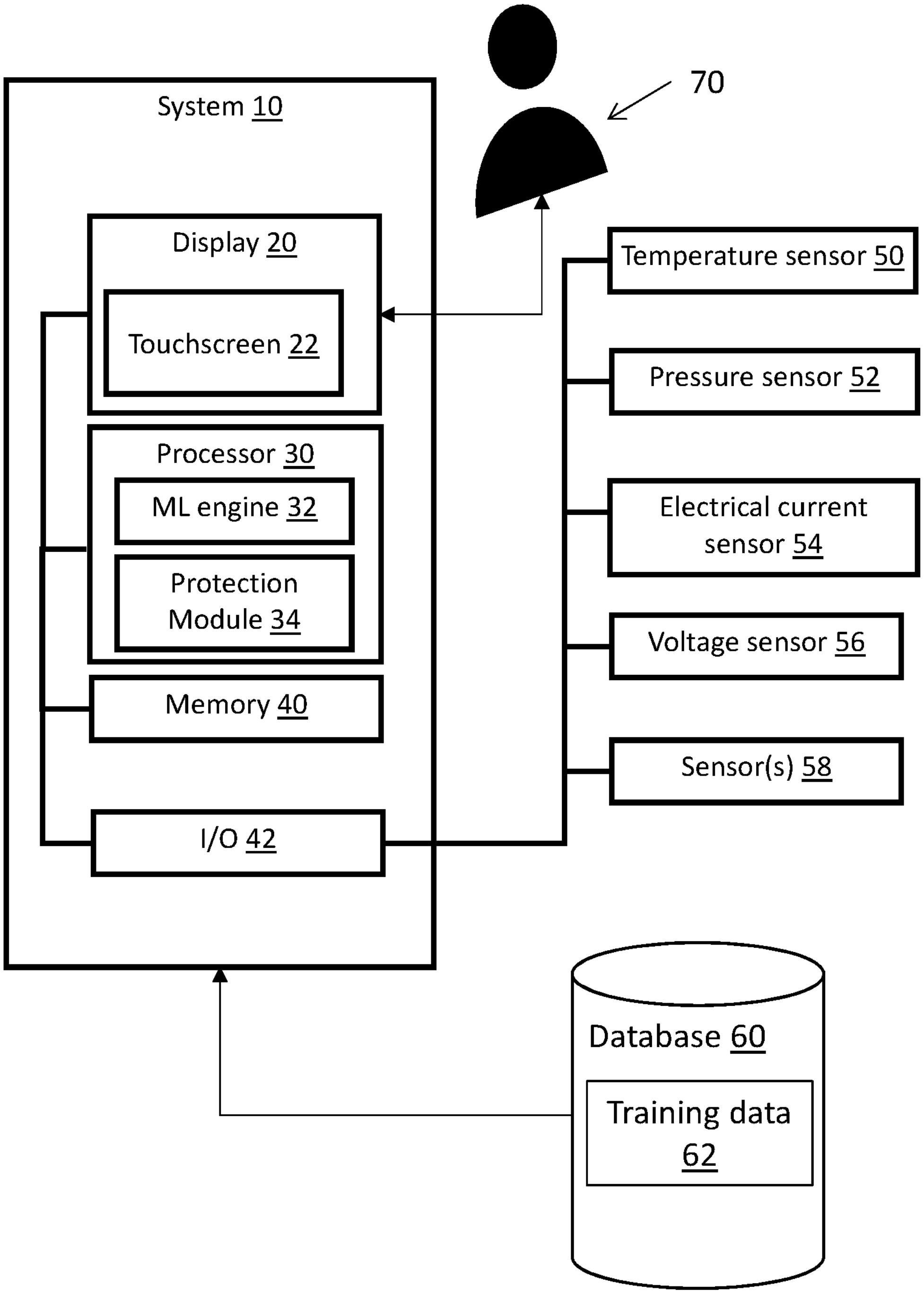
FIG. 1 is a schematic illustration of a system for detecting anomalous system behavior.

FIG. 1 schematically shows an example embodiment comprising a management system 10 for monitoring an engineering asset. The engineering asset may be on a marine vessel, for example chilled water (CHW) plants, transmission, starboard shaft, port shaft, one or more CHW circulation pumps, gas turbine, converters, DBRs, propulsion motor, high voltage (HV) switch board, low voltage (LV) switchboard, HV filters, HV/LV transformers, LV filters, diesel generators, emergency generators, heating, ventilation and air conditioning (HVAC) system, pressurized air, fresh water system, salt water (SW) system. It will be appreciated that the management system may also be used on other systems, e.g. railway rolling stock bogies, nuclear reactor coolant pumps, gas turbine engines for passage aircraft or oil rig drill bearings.

The management system 10 is connected to a plurality of sensors, including a temperature sensor 50, a pressure sensor 52, an electrical current sensor 54, a voltage sensor 56 and other sensor(s) 58, e.g. a sensor to measure the mass of any fluids in the system. It will be appreciated that the depicted sensors are merely illustrative, and any suitable sensors may be included in the overall system. The combination of sensors may record a plurality of physical parameters, e.g. temperatures, pressures, salinity, chemical concentrations, fluid flow rates, electrical currents, voltages or any other physical parameter, which alone or together with digital parameters describing the configuration of the system, e.g. valve positions in a piping assembly, are indicative of whether the engineering asset is operating in a healthy or faulty state. For example, for a chilled water plant, the sensor data may include readings such as temperature and pressure of the water and the coolant, from before and after the pump, and pump mechanical power, current rate etc.

Some of the internal detail of the display system 10 is shown in FIG. 1. There are standard components of whichever hardware solution is deployed, including for example a display 20, a processor 30, memory 40 and an interface 42 for connecting with the sensors 50, 52, 54, 56, 58. The display may include a touchscreen 22 or may be any other suitable display on which information (including an alert) may be displayed to a user 70. The management system 10 is also connected to a database 60 which may be located remotely (i.e. in a different location) from the management system, including for example in the cloud. The database 60 comprises training data 62 which is used to train the management system as described in more detail below. It will be appreciated that there may be other standard components which are omitted for clarity.

The processor 30 may process the received sensor data and training data in any appropriate way. As illustrated, the specific processing may be completed in dedicated modules, e.g. a machine learning engine (or module) 32 or a protection module 34. For example, the automated self-protection protocol module shown in FIG. 1 may be included in addition to or as an alternative to the user interface. Such a module may be triggered by a classification of the engineering asset as likely to fail within the horizon time and may control components within or the whole engineering asset. For example where the engineering asset comprises a diesel engine, shaft-speed limitations may be introduced or where the engineering asset comprises a pump, suction pressure, motor speed or discharge pressure within the pump may be adjusted or controlled. Merely as another example, where the engineering asset is a refrigeration plant, the asset may be shutdown.

Terms such as 'component', 'module', 'processor' or 'unit' used herein may include, but are not limited to, a hardware device, such as circuitry in the form of discrete or integrated components, graphical processing units (GPUs), a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements.

Figure 2A:
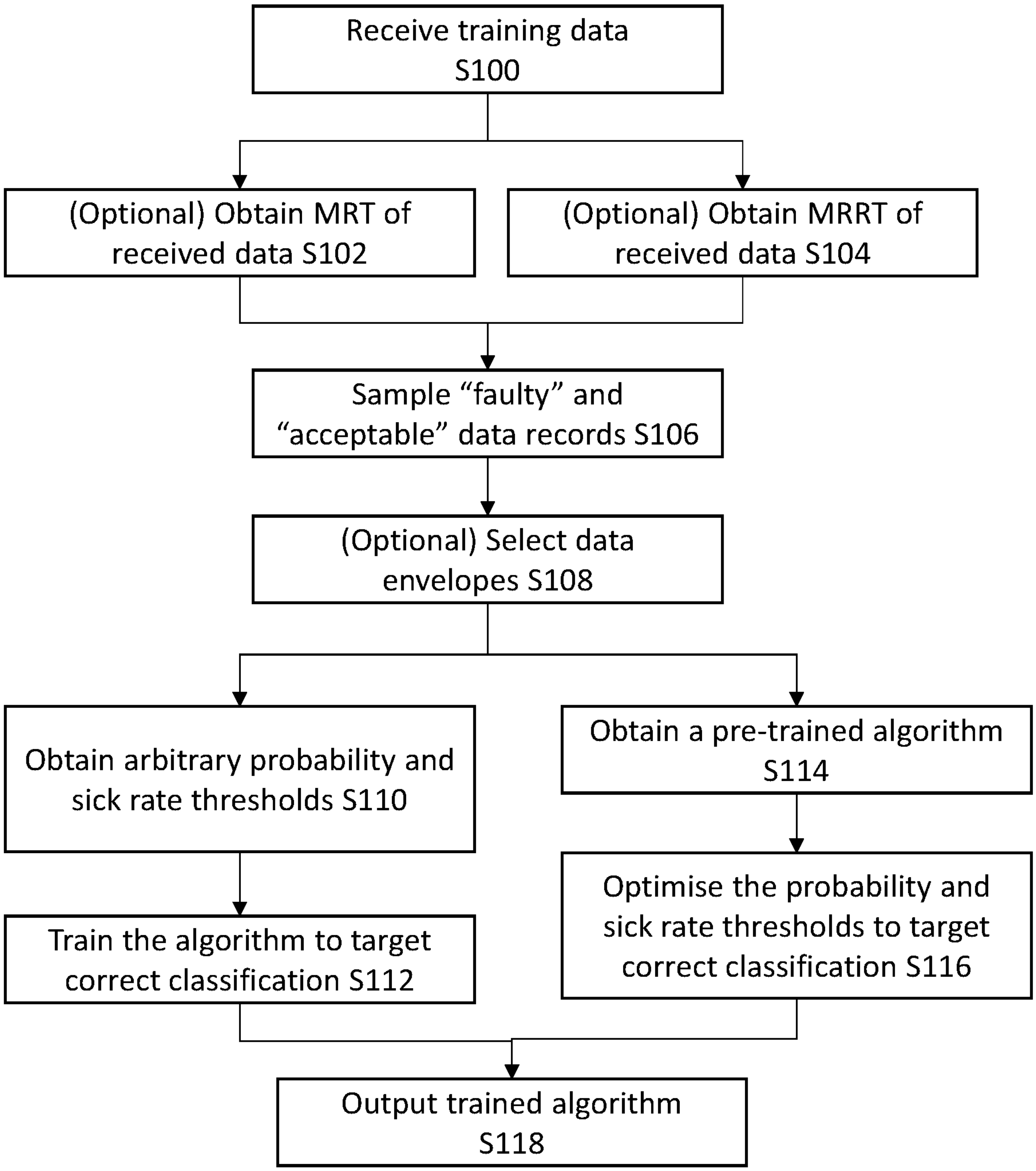
FIG. 2*a* is a flowchart setting out the steps carried out by the system of FIG. 1 when training.
Figure 2B:
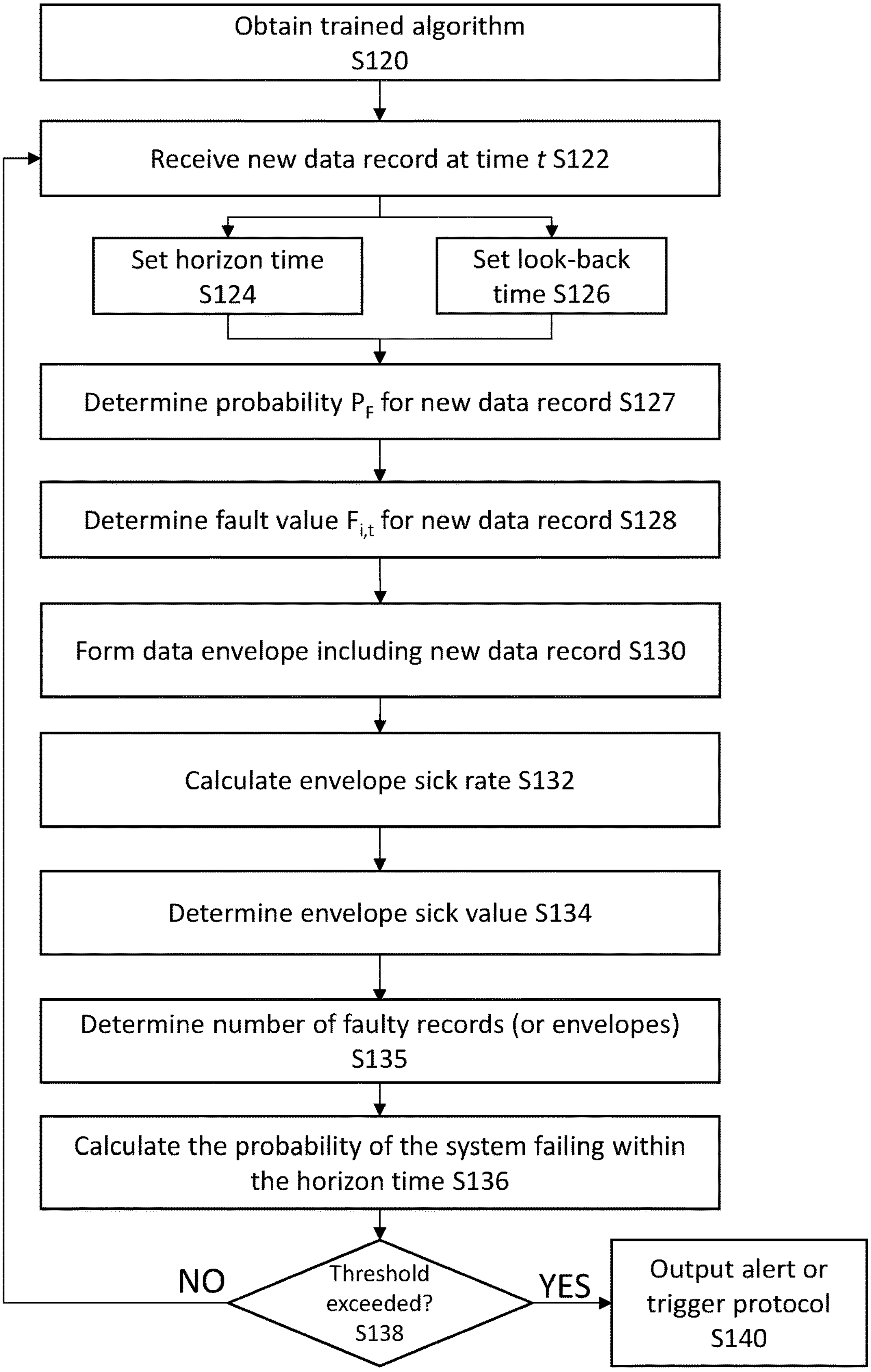
FIG. 2*b* is a flowchart setting out the steps carried out by the system of FIG. 1 to predict anomalous behavior.

FIGS. 2*a* and 2*b* illustrate the steps which may be carried out by the system shown in FIG. 1. It will be appreciated that, unless indicated otherwise, the following steps can be carried out in any order, and not just the one described below. Furthermore, some of the steps could be carried out simultaneously or some steps could be omitted.

FIG. 2*a* shows the first phase of the method which relates to the training phase in which supervised learning may be carried out as explained below. Training data is received at step S100. The training data may comprise a plurality of data records from the sensor(s) monitoring an asset identical to the subject system. Any given record within the training data may be labelled based on its ordinal position in the sequence of available data (e.g. first, second, third etc corresponding to i=1, 2, 3 etc.) and the time t at which it is recorded. The data may have been recorded from the sensors at a fixed frequency or may be irregular and thus the time between records may or may not be constant. The data is recorded for engineering assets which are ideally identical to the one which is to be monitored. The training data also records the failure time of the engineering asset. The training data may also include recorded data from the very same system which is being monitored.

Figure 3:
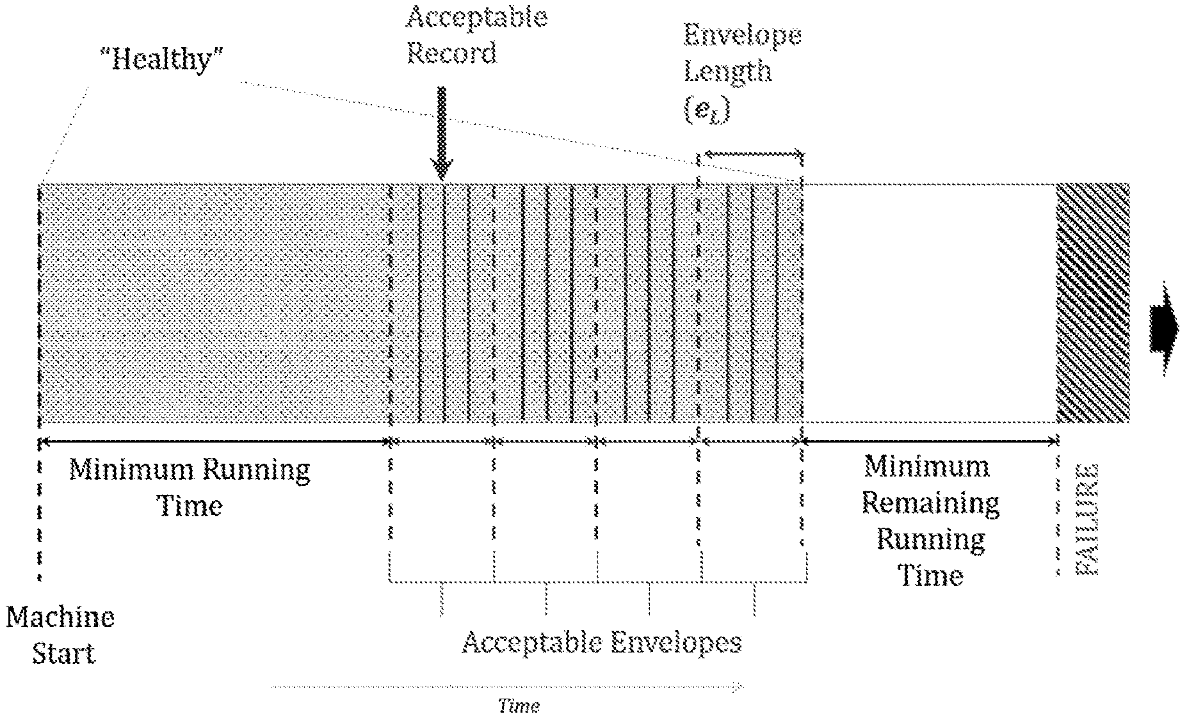
FIG. 3 plots a plurality of data measurements over time including measurements taken during healthy operation and failure.

FIG. 3 illustrates an example of a time series of training data. As shown in FIG. 3, the data begins when the machine (or engineering asset) is started and continues until and after the machine has failed. When training classical (i.e. non-deep learning) machine learning binary classification algorithms for PHM using supervised learning, it is necessary to provide the algorithms with examples of both known healthy running behavior for a system and faulty running. The selection of data conforming to these requirements in the existing literature is typically based on the assumption that a system's behavior when new (or newly repaired) will be "healthy" whereas immediately prior to a failure the system will be faulty.

Returning to FIG. 2*a*, as shown at step S102, an optional step is to obtain the minimum running time (MRT) within the received training data. The MRT will depend on the nature of the engineering asset being monitored but may be defined as the minimum time period for the complex engineering asset to decay from its original pristine condition after being started. For example, the MRT may thus be any appropriate time, e.g. measured in seconds, hours or even days, depending on the system. This minimum running time may be obtained by reference to an operator's (e.g. marine engineering officers') knowledge of the engineering asset, may be input automatically by the management system or may come from the general knowledge of the certifying authorities, e.g. the ship insurers. The data may then be sampled from a period of time after the Minimum Running Time (MRT) as illustrated in FIG. 3.

Returning to FIG. 2*a*, as shown at step S104, another optional step is to obtain the Minimum Remaining Running Time (MRRT). This step may be done simultaneously with step S102 as illustrated or the steps may be carried out in any order. As illustrated in FIG. 3, the MRRT is a relatively brief period prior to system failure and it is only in this period that human intervention is required. The MRRT may be determined based on risk/cost/benefit calculations weighing the costs of replacement parts and equipment and working hours against the costs incurred by the failure of an engineering asset. For example, like the MRT, the MRRT may be any appropriate time, e.g. measured in seconds, hours or even days, depending on the system.

When the MRT and MRRT are obtained, as shown in FIG. 2*a*, at step S106, the received training data may be sampled as "acceptable" running data and "faulty" running data. "Acceptable" running data may be defined as data records having occurred after the initial MRT has elapsed until immediately before the MRRT. FIG. 3 illustrates the period in which "acceptable" data is sampled and this period may be sampled heavily from the available data. Faulty data is sampled during the MRRT, i.e. from the time immediately prior to failure as shown in FIG. 4.

"Acceptable" running data may be considered as an alternative to including all the data records which are indicative of truly "healthy" running. This may alleviate issues with known classifiers in which "faulty" behavior is erroneously detected very early in a system's life cycle, prompting unnecessary human intervention, and provoking enormous error in RUL estimations (as with so much remaining life, the variations in the behavior of a vessel and the conditions a system is exposed to can be enormous). In the present proposal, it is assumed that a system will accrue wear and damage throughout its life yet continue to function and retain economic value.

Figure 4:
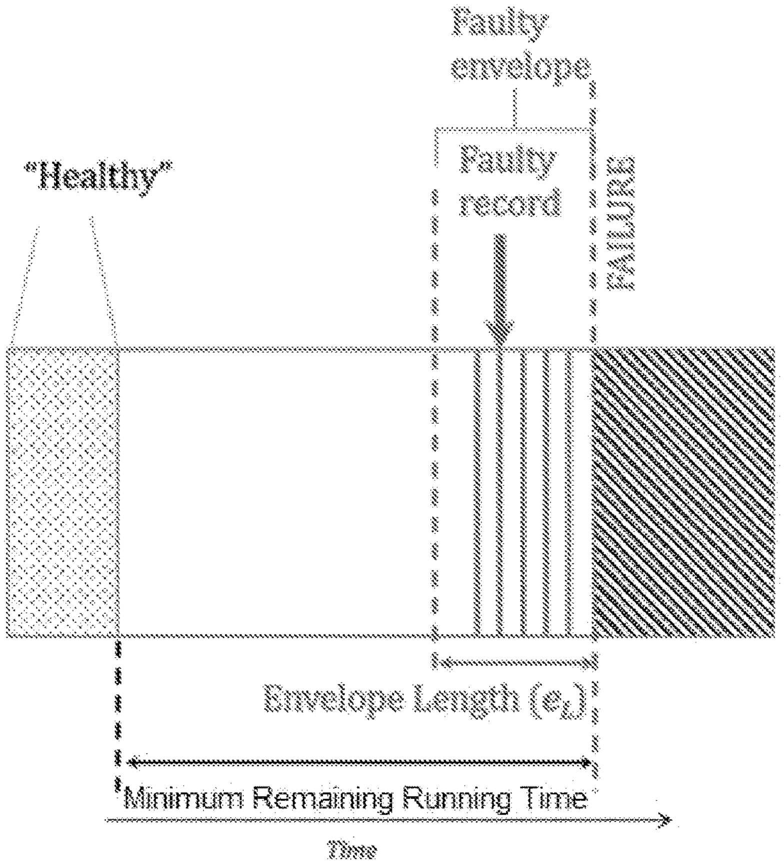
FIG. 4 illustrates how faulty data may be sampled from the data shown in FIG. 3.

FIGS. 3 and 4 also illustrate that the data records may be grouped into a plurality of data envelopes each having an envelope length ($e_L$). As shown in FIG. 3 each of the data records is captured at a set, uniform frequency and thus there are the same number (merely as an illustration—four in this example) of data records within each envelope. However, as set out above, the data records may be recorded at irregular time intervals and in such an instance, the envelopes may contain different numbers of data records. Thus, returning to FIG. 2*a*, an optional step S108 may be to select data envelopes within the sampled data. Selecting data envelopes may comprise selecting the envelope length ($e_L$).

For each data record i, if a probability ($P_F$) of the record being faulty at a time t exceeds or equals a critical level (which may be referred to as a probability threshold, $P_{th}$), the record may be assigned a fault' value ($F_{i,t}$) of one. Alternatively, if a probability ($P_F$) of the record being faulty at a time t is lower than the probability threshold, $P_{th}$, the fault value is zero, as defined below by equation 1:

$$F_{i,t} = \begin{cases} 0, & P_F < P_{th} \\ 1, & P_F \geq P_{th} \end{cases} \quad \text{(equation 1)}$$

The notation above in which the fault values are assigned both i and t subscript values reflects the fact that any given record can be labelled based on its ordinal position in the sequence of available data (i) and the time t at which it is recorded.

For each data envelope, a value which is termed the sick rate $S_R$ may be calculated from the fault values for the data records. The sick rate $S_R$ may be calculated as sum of the fault values $F_{i,t}$ for each record within the envelope divided by the number of records (N) within the envelope as defined by equation $$S_R = \frac{\sum_{t-e_L}^{t} F_{i,t}}{N} \quad \text{equation (2)}$$

where $e_L$ is the envelope length as defined above.

In other words, the fault values for each record within a period of time ($e_L$) preceding the most recent record at time t are summed together. It should also be noted that in this formulation, the sick rate can be applied both in the case of regular data supply (i.e. data being recorded for all sensor channels simultaneously at a set frequency), and in the case of irregular data supply. This is because it does not assume that the time between records is consistent (allowing for N to fluctuate for a given value of $e_L$).

For each envelope j, if the sick rate equals or exceeds a critical threshold (which may be referred to as a sick rate threshold $S_{crit}$), the system may be determined to be faulty at the time t. An envelope which is determined to be in faulty state may be given a sick value of 1 and an envelope which is determined to be in a non-faulty state may be given a sick value of 0. The sick value is determined by equation 3:

$$S_{j,t} = \begin{cases} 0, & S_R < S_{crit} \\ 1, & S_R \geq S_{crit} \end{cases} \quad \text{equation (3)}$$

The use of the probability and sick rate thresholds described above, provides new options for training the underlying machine learning algorithm. For example, as shown in step S110, arbitrary values for the probability threshold ($P_{th}$) and the sick rate threshold ($S_{crit}$) may be set.

The next step S112 is then to train the machine learning algorithm to target correct classification of the envelopes and the records within the envelopes as faulty or not-faulty using the received training data (i.e. to generate values for PF which, via equations 1, 2 and 3 lead to correct classification of the state of the engineering asset). The training may be done in any standard way, for example by evaluating an appropriate loss function. Examples of suitable loss functions include area under receiver operating or precision/recall curves. In this case, effort is directed primarily at optimizing the machine learning classification algorithm to produce values of $P_F$ which lead to correct classification of the state of a data envelope given set values of for the probability threshold ($P_{th}$) and the sick rate threshold ($S_{crit}$).

Another option for training the machine learning algorithm may be to obtain as in step S114 a pre-trained algorithm (e.g. one trained as in steps S110 and S112—or perhaps using a different training method). The next step S116 is then to train the machine learning algorithm to target the optimum values of the probability threshold ($P_{th}$) and the sick rate threshold ($S_r$) which best fit the training data to correctly classify the envelopes and hence the records within the envelopes as faulty or not-faulty. Again, the training may be done in any standard way, for example by simple brute force searching of the two-dimensional space described by these variables, and evaluating an appropriate loss function across the search space. In this case effort is directed primarily at optimising the values of for the probability threshold ($P_{th}$) and the sick rate threshold ($S_{crit}$) given a pre-trained machine learning classification algorithm.

Both training options lead to a trained algorithm being output at step S118. The trained algorithm may be used as described in FIG. 2*b*.

FIG. 2*b* illustrates the application of the output trained algorithm to monitor the performance of an engineering asset in real-time. As shown at step S120, the trained algorithm is obtained. A new data record is also received at step S122. The new data record may be a large corpus of sensor data which corresponds to the data records used to train the trained algorithm to correctly classify whether the engineering asset is in a "faulty" or "non-faulty" state. The new data record may or may not be derived from the same engineering asset as the training data, however the engineering asset should be essentially the same (and preferably identical) and capable of generating data equivalent in type and dimensionality to the training data.

Figure 5:
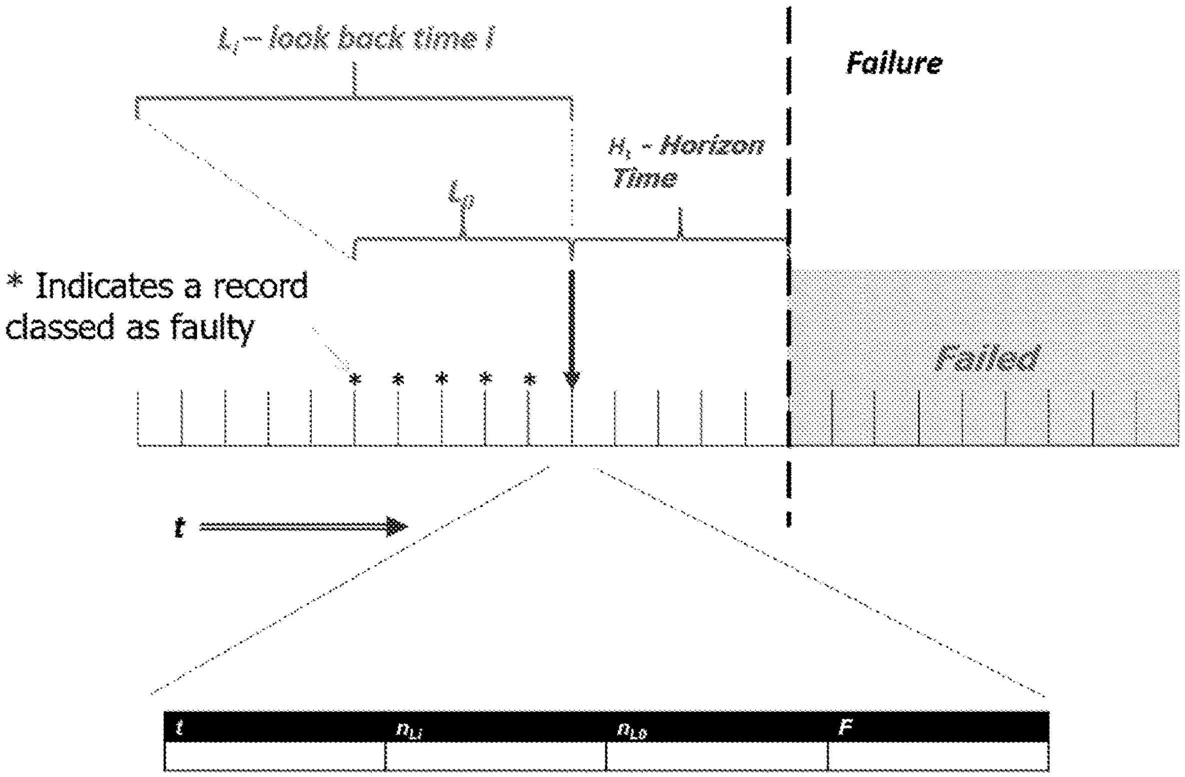
FIG. 5 illustrates an alternative technique for sampling faulty data.

The management system may forecast the probability of the asset (or system) failing within a prescribed time period. This prescribed time period may be termed the horizon time ($H_t$) and may be set (or simply obtained) in step S124. FIG. 5 illustrates a time series of data records and illustrates the horizon time in this example occurs after another five data records are obtained. The horizon time may be set based on the engineering asset being monitored and the requirements of the end user. A cost/benefit calculation similar to that used to produce the MRRT may be used to determine a desirable horizon time. Example time frames may range from minutes (to provide warning for immediate engineering intervention) to months (to provide adequate warning for the repositioning of engineering supplies/acquisition of the long-lead items require for a repair/scheduling of major maintenance). The applicant has commonly used $H_t$ values of 24 hours in previous work.

In addition to obtaining a horizon time which looks into the future, a look-back time ($L_t$) may also be set in step S126 of FIG. 2*b*. The look-back time ($L_t$) may be for the same time period as the horizon time ($H_t$), e.g. five previous time records as in the example shown in FIG. 5. Alternatively, the horizon time ($H_t$) and the look-back time ($L_t$) may have differing lengths. Steps S126 and S128 are depicted in FIG. 2*b* as occurring at the same time but it will be appreciated that they may be carried out sequentially or at any suitable time in the method.

The management system may then use the trained algorithm at step S127 to determine a first probability ($P_F$) as to whether the new data record (recorded at time t) indicates that the asset which is being managed is "faulty" or "not-faulty". As shown at step S128, equation 1 may then be applied to determine if the data record is indicative of the engineering system being in a faulty state ($F_{i,t}$ has a value 1) or a non-faulty state ($F_{i,t}$ has a value 0).

Optionally, the new data record may then be grouped with at least some of the previously received data records in the look-back time ($L_t$) to form a data envelope (labelled j and ending at time t) as described above. Each data envelope includes all records available within the envelope length time ex prior to the time t. The envelope length time et is normally shorter than the length of the look-back time ($L_t$) and other envelopes which occur before the envelope including the new data record may also be defined by grouping earlier data records. Once the records have been grouped, the sick rate ($S_R$) of the (or each) envelope is calculated using equation 2 (step S132). The sick rate ($S_R$) is used in equation 3 to determine the sick value ($S_{j,t}$) for the (or each) envelope. The sick value may be considered to be an overall classification of the system being in a faulty state ($S_{j,t}$ has a value 1) or a non-faulty state ($S_{j,t}$ has a value 0).

As shown in step S135, the number of faulty data records or envelopes ($n_{Lt}$) within the look-back time may then be determined. Using the look-back time ($L_t$), the horizon time ($H_t$) and the number of faulty records or envelopes ($n_{Lt}$) within the look-back time, the probability of the system failing with the horizon time ($H_t$) after the moment of calculation (t) may then be forecast as in step S136. The probability may be forecast by using a Bayes equation such as that shown in equation 4, which is repeated below:

$$P(F_{H_t}|n_{Lt}) = \frac{P(n_{Lt}|F_{H_t}) \times P(F_{H_t})}{P(n_{Lt})} \quad \text{(Equation 4)}$$

where $F_{Ht}$ is the failure of the system within the time period which follows the moment of evaluation t and which is equal in length to the horizon time $H_t$, $n_{Lt}$ is the number of faulty records or envelopes within the look-back time $L_t$ prior to the moment of evaluation f, $P(F_{Ht}|n_{Lt})$ is the probability of failure of the engineering asset within the horizon time $H_t$ after the moment of evaluation t given n records/envelopes classed as faulty in the look-back time $L_t$ prior the moment of evaluation t, $P(n_{Lt}|F_{Ht})$ is the probability of n records/envelopes being classed as faulty in look back time $L_t$ prior to the moment of evaluation t given that a failure is known to have occurred within time $H_t$ after the moment of evaluation t, $P(F_{Ht})$ is the probability of failure in any time period equivalent in length to the horizon time $H_t$ and $P(n_{Lt})$ is the probability of n records/envelopes classed as failure in any time period equivalent in length to the look-back time $L_t$.

In other words, for any given record, the probability of the system failing completely in the horizon time from that record is determined as a product of the probability of n records/envelopes being classed as faulty in the look-back time measured from the time of the new data record and the probability of failure happening in any time period of length equivalent to the horizon time divided by the probability of n records/envelopes being classed as faulty in any time of length period equivalent to the look-back time. This formulation may permit the use of existing probabilistic computing techniques to determine the probability function, for example as described in the textbook "*Practical Probabilistic Programming*" by Avi Pfeffer, published by Manning Publications or by using standard software packages such as Edward, PyMCs and PyStan. It is also noted that a background to Bayesian optimization techniques is found in "*Bayesian Approach to Global Optimization: Theory and Applications*" by Jonas Mockus published by Springer Science & Business Media.

Once the probability of failure has been determined, the management system may determine compare the calculated probability with a pre-set threshold determined by a user (step S138). If the calculated probability is greater than the threshold, an alert may be output to the user (step S140). For example, a visual alert may be output on the display screen or an audible alert may be output. The output may be presented as a decision aid in a graphical user interface on the display screen. Alternatively, or in addition to output the alert, the self-protection protocol may be triggered at step S140. The self-protection protocol may adjust one or more components within the engineering asset in an attempt to reduce the probability of system failure to below the threshold. In some instances, e.g. when the probability of system failure is significantly higher than the threshold, the self-protection protocol may determine that the engineering asset needs to be switched off completely. If the probability of system failure within the horizon time is below the threshold set by the user, the system continues to collect and evaluate more data.

Equation 4 may be extended to produce a plurality of hierarchical models comprising sub-models in which the number of records/envelopes ($n_{L0}$, $n_{L1}$, $n_{L2}$, . . . $n_{Lj}$) classed as faulty through multiple look-back time windows ($L_0$, $L_1$, $L_2$, . . . $L_i$) of varying length are used to construct prior distributions. This may provide a more accurate prediction. Other adaptations may be made, e.g. to include more background or more detail. The adaptability of the Bayesian forecasting is a useful tool in improving the predictions.

Additional data may also be used to generate other sub-models. For example, total system run-time since last repair (survival analytics) may be used to generate sub-models. For marine vessels, metrics pertaining to the current state of the sea (or other water body) on which the marine vessel is operating may be used to generate sub-models. These additional sub-models may be brought into the overall hierarchical model to provide increasingly sophisticated forecasts for the probability of failure within the horizon time.

The three approaches described above (determining an acceptable running sample, use of time envelopes and Bayesian forecasting) may be combined to produce a fault detection algorithm with the ability to provide the user with an estimate of the probability of failure in the following horizon time. Appropriately trained and configured copies of the algorithm may work simultaneously on multiple systems and specific sub-systems. For example, a marine vessel may comprise a plurality of chilled water plants and four copies of the algorithm may be deployed, either having been trained on data accumulated on the specific chilled water plant they are to monitor, or having been trained on data pooled from several chilled water plants.

When training, the training data may have been sampled as "faulty" or "acceptable" using the MRT and MRRT described above and/or grouped in time envelopes. As set above, the training may be done by evaluating an appropriate loss function. The applicant has also recognized that more elegant solutions, such as the application of Bayesian optimisation functions may also be used and may be highly beneficial in terms of reduced computational overhead.

Attention is directed to all papers and documents which are filed concurrently with or previous to this specification in connection with this application and which are open to public inspection with this specification, and the contents of all such papers and documents are incorporated herein by reference.

Although a few preferred embodiments have been shown and described, it will be appreciated by those skilled in the art that various changes and modifications might be made without departing from the scope of the invention, as defined in the appended claims. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A computer-implemented method for predicting failure of an engineering asset based on real-time data, the method comprising:

receiving a data record comprising data on the engineering asset collected from a plurality of sensors at time t;

generating, using a trained machine learning algorithm, a probability $P_F$ that the received data record indicates that the engineering asset is in a faulty state;

determining what number of data records received in a look-back time $L_t$ are indicative of the engineering asset being in the faulty state, wherein the look-back time $L_t$ is a time period occurring before the time t at which the data record was collected;

predicting a probability of the engineering asset failing during a horizon time $H_t$, wherein the horizon time $H_t$ is a time period after the time t at which the data record was collected, wherein the predicting includes implementing a Bayes forecasting model to predict the probability of failure within the horizon time $H_t$ based on the generated probability $P_F$ and the number of data records which were determined to be faulty within the look-back time $L_t$, comparing the predicted probability to a failure threshold; and responsive to the predicted probability exceeding the failure threshold, outputting (a) an alert to act as a decision aid to a user and (b) a signal to trigger an automated self-protection protocol within the engineering asset, wherein the self-protection protocol adjusts one or more components within the engineering asset.

2. The method of claim 1, further comprising generating a fault value $F_{i,t}$ for each data record i at time t, from $$F_{i,t} = \begin{cases} 0, & P_F < P_{th} \\ 1, & P_F \geq P_{th} \end{cases}$$

where $P_F$ is the probability of the data record being faulty and $P_{th}$ is a probability threshold.

3. The method of claim 1, comprising grouping the received data record with multiple previously received data records to form an envelope of data records, wherein each envelope has an envelope length (eL) and contains a sequence of all data records recorded during a time interval equal to the envelope length.

4. The method of claim 3, comprising determining that an envelope is indicative of the engineering asset being in a faulty state by:

calculating a sick rate of the envelope from a normalised sum of each fault value for each data record within the envelope;

comparing the sick rate to a sick rate threshold; and responsive to a sick rate of the envelope equaling or exceeding the sick rate threshold, determining that the envelope is indicative of running in a faulty state.

5. The method of claim 1, wherein determining what number of data records received in the look-back time are indicative of the engineering asset being in a faulty state comprises determining what number of envelopes received in the look-back time are indicative of the engineering asset being in a faulty state.

6. The method of claim 1, wherein the Bayes forecasting model is defined as:

$$P(F_{H_t}|n_{Lt}) = \frac{P(n_{Lt}|F_{H_t}) \times P(F_{H_t})}{P(n_{Lt})}$$

where $F_{Ht}$ is the failure of the system within the time period equal to $H_t$ following the moment of time t, $n_{Lt}$ is the number of faulty records or envelopes within the look-back time $L_t$ prior to the moment of time t, $P(F_{Ht}|n_{Lt})$ is the probability of failure within a time period time $H_t$ after the moment of time t given n records or envelopes classed as faulty in the time $L_t$ prior the moment of time t, $P(n_{Lt}|F_{Ht})$ is the probability of n records or envelopes classed as faulty in look back time $L_t$ prior to the moment of time t given that a failure is known to have occurred within time $H_t$ after the moment of time t, $P(F_{Ht})$ is the probability of failure in any time equivalent in length to the horizon time $H_t$, and $P(n_{Lt})$ is the probability of n records or envelopes classed as faulty in any time equivalent in length to the look-back time $L_t$.

7. The method of claim 1, wherein the Bayes forecasting model comprises a plurality of sub-models, one for each of a plurality of different look-back times (L0, L1, L2, . . . , Lj) and the method comprises, for each sub-model:

determining what number of data records or envelopes (nL0, nL1, nL2, . . . nLj) received in the corresponding look-back time (L0, L1, L2, . . . Lj) are indicative of the engineering asset being in a faulty state.

8. The method of claim 1, comprising training the machine learning algorithm by:

receiving multiple data records for at least one engineering asset which corresponds to the engineering asset for which failure is to be predicted, wherein the multiple data records comprise data previously collected from the plurality of sensors at a sequence of times prior to failure of the least one engineering asset; and classifying each of the multiple data records as either indicative of the at least one engineering asset running in an acceptable state or running in a faulty state.

9. The method of claim 8, wherein classifying each of the multiple data records as indicative of running in a faulty state comprises:

obtaining a minimum remaining running time, MRRT, which is a time period before failure of the at least one engineering asset; and classifying each of the multiple data records which is within the minimum remaining running time as indicative of running in a faulty state.

10. The method of claim 9, wherein classifying each of the multiple data records as indicative of running in an acceptable state comprises:

obtaining a minimum running time, MRT, which is a time period after the at least one similar engineering asset has been started; and classifying each of the multiple data records which is after the minimum running time and before the minimum remaining running time as indicative of running in an acceptable state.

11. The method of claim 1, comprising training the machine learning algorithm by:

receiving multiple data records for at least one engineering asset which corresponds to the engineering asset for which failure is to be predicted, wherein the multiple data records comprise data previously collected from the plurality of sensors at a sequence of times prior to failure of the least one engineering asset;

grouping the multiple data records into a plurality of data envelopes each having an envelope length ($e_L$); and targeting correct classification of each data record within each data envelope as indicative of running in a faulty state or running in a not-faulty state.

12. The method of claim 11, wherein targeting correct classification comprises:

determining (a) that a data envelope is indicative of running in a faulty state responsive to a sick rate of the data envelope equaling or exceeding a sick rate threshold, and (b) that a data envelope is indicative of running in a non-faulty state responsive to a sick rate of the data envelope being lower than the sick rate threshold;

wherein the sick rate of each data envelope is equal to the sum of each fault value for the multiple data records within the data envelope, divided by the number of data records within the data envelope, and wherein the fault value for each of the multiple data records is set to 0 or 1 and the fault value for each of the multiple data records is equal to 1 when a probability that the data record is faulty exceeds a probability threshold and 0 otherwise.

13. A computer program product comprising one or more non-transitory machine-readable mediums comprising processor control code which when executed by one or more processors causes a process to be carried out for predicting failure of an engineering asset based on real-time data, the process comprising:

receiving a data record comprising data on the engineering asset collected from a plurality of sensors at time t;

generating, using a trained machine learning algorithm, a probability $P_F$ that the received data record indicates that the engineering asset is in a faulty state;

determining what number of data records received in a look-back time $L_t$ are indicative of the engineering asset being in the faulty state, wherein the look-back time $L_t$ is a time period occurring before the time t at which the data record was collected;

predicting a probability of the engineering asset failing during a horizon time $H_t$, wherein the horizon time $H_t$ is a time period after the time t at which the data record was collected, wherein the predicting includes implementing a Bayes forecasting model to predict the probability of failure within the horizon time $H_t$ based on the generated probability $P_F$ and the number of data records which were determined to be faulty within the look-back time $L_t$;

comparing the predicted probability to a failure threshold; and responsive to the predicted probability exceeding the failure threshold, outputting (a) an alert to act as a decision aid to a user and (b) a signal to trigger an automated self-protection protocol within the engineering asset, wherein the self-protection protocol adjusts one or more components within the engineering asset.

14. The computer program product of claim 13, wherein determining what number of data records received in the look-back time are indicative of the engineering asset being in a faulty state includes determining what number of envelopes received in the look-back time are indicative of the engineering asset being in a faulty state, and determining that an envelope is indicative of the engineering asset being in a faulty state includes:

calculating a sick rate of the data envelope from a normalised sum of each fault value for each data record within the envelope;

comparing the sick rate to a sick rate threshold; and responsive to a sick rate of the data envelope equaling or exceeding the sick rate threshold, determining that the data envelope is indicative of running in a faulty state.

15. A system for predicting failure of an engineering asset based on real-time data, the system comprising:

a plurality of sensors for measuring data on the engineering asset; and a processor which is configured to receive a data record comprising data on the engineering asset collected from the plurality of sensors at time t, generate, using a trained machine learning algorithm, a probability $P_F$ that the received data record indicates that the engineering asset is in a faulty state, determine what number of data records received in a look-back time Lt are indicative of the engineering asset being in the faulty state, wherein the look-back time Lt is a time period occurring before the time t at which the data record was collected, and predict a probability of the engineering asset failing during a horizon time Ht, wherein the horizon time Ht is a time period after time t at which the data record was collected, wherein the predicting implements a Bayes forecasting model to predict the probability of failure based on the generated probability PF and the number of data records which were determined to be faulty within the look-back time Lt, compare the predicted probability to a failure threshold, and responsive to the predicted probability exceeding the failure threshold, output (a) an alert to act as a decision aid to a user, and (b) a signal to trigger an automated self-protection protocol within the asset, wherein the self-protection protocol adjusts one or more components within the engineering asset.

16. The system of claim 15, wherein the processor is configured to generate a fault value Fi,t for each data record i at time t, from $$F_{i,t} = \begin{cases} 0, & P_F < P_{th} \\ 1, & P_F \geq P_{th} \end{cases}$$

where $P_{th}$ is a probability threshold.

17. The system of claim 15, wherein the processor is configured to group the received data record with multiple previously received data records to form an envelope of data records, wherein each envelope has an envelope length (eL) and contains a sequence of all data records recorded during a time interval equal to the envelope length.

18. The system of claim 15, wherein the processor is configured to determine what number of data records received in the look-back time are indicative of the engineering asset being in a faulty state by determining what number of envelopes received in the look-back time are indicative of the engineering asset being in a faulty state, the processor configured to determine that an envelope is indicative of the engineering asset being in a faulty state by:

calculating a sick rate of the data envelope from a normalised sum of each fault value for each data record within the envelope;

comparing the sick rate to a sick rate threshold; and responsive to a sick rate of the data envelope equaling or exceeding the sick rate threshold, determining that the data envelope is indicative of running in a faulty state.

19. The system of claim 15, wherein the Bayes forecasting model is defined as:

$$P(F_{H_t}|n_{Lt}) = \frac{P(n_{Lt}|F_{H_t}) \times P(F_{H_t})}{P(n_{Lt})}$$

where $F_{Ht}$ is the failure of the system within the time period equal to $H_t$ following the moment of time t, $n_{Lt}$ is the number of faulty records or envelopes within the look-back time $L_t$ prior to the moment of time t, $P(F_{Ht}|n_{Lt})$ is the probability of failure within a time period time $H_t$ after the moment of time t given n records or envelopes classed as faulty in the time $L_t$ prior the moment of time t, $P(n_{Lt}|F_{Ht})$ is the probability of n records or envelopes classed as faulty in look back time $L_t$ prior to the moment of time t given that a failure is known to have occurred within time $H_t$ after the moment of time t, $P(F_{Ht})$ is the probability of failure in any time equivalent in length to the horizon time $H_t$, and $P(n_{Lt})$ is the probability of n records or envelopes classed as faulty in any time equivalent in length to the look-back time $L_t$.

20. The system of claim 19, wherein the Bayes forecasting model comprises a plurality of sub-models, one for each of a plurality of different look-back times (L0, L1, L2, . . . Lj) and the method comprises, for each sub-model:

determining what number of data records or envelopes (nL0, nL1, nL2, . . . nLj) received in the corresponding look-back time (L0, L1, L2, . . . Lj) are indicative of the engineering asset being in a faulty state.

* * * * *